United States Patent
Chu

(10) Patent No.: US 11,999,437 B2
(45) Date of Patent: Jun. 4, 2024

(54) BICYCLE HYDRAULIC ASSEMBLY AND BICYCLE BRAKE DEVICE

(71) Applicant: TEKTRO TECHNOLOGY CORPORATION, Changhua County (TW)

(72) Inventor: En-Liang Chu, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 390 days.

(21) Appl. No.: 17/466,110

(22) Filed: Sep. 3, 2021

(65) Prior Publication Data

US 2022/0089249 A1 Mar. 24, 2022

(30) Foreign Application Priority Data

Sep. 18, 2020 (TW) ................................. 109132252

(51) Int. Cl.
*B62L 3/02* (2006.01)
*F15B 15/14* (2006.01)

(52) U.S. Cl.
CPC .............. *B62L 3/023* (2013.01); *F15B 15/14* (2013.01)

(58) Field of Classification Search
CPC .......... F15B 15/14; B60T 11/16; B60T 11/18; B60T 11/224; B60T 11/236; B60T 7/102; B62L 1/005; B62L 3/023; B62K 23/06
USPC ......................................................... 188/344
See application file for complete search history.

(56) References Cited

U.S. PATENT DOCUMENTS

| | | | | |
|---|---|---|---|---|
| 2,737,777 A * | 3/1956 | Krusemark | ........... | B60T 11/224 60/563 |
| 2010/0043426 A1* | 2/2010 | Moore | ................... | B60T 11/224 60/594 |
| 2013/0284552 A1* | 10/2013 | Moore | .................... | B60T 11/18 188/344 |

FOREIGN PATENT DOCUMENTS

DE 202017001936 U1 * 11/2017

* cited by examiner

*Primary Examiner* — Robert A. Siconolfi
*Assistant Examiner* — San M Aung
(74) *Attorney, Agent, or Firm* — Maschoff Brennan

(57) ABSTRACT

A bicycle hydraulic assembly includes a casing, a first piston, and a second piston. The casing has a hydraulic chamber, an inlet channel, and an outlet channel connected to the hydraulic chamber. The first piston is located in the hydraulic chamber. The second piston is sleeved on the first piston. The second piston has a first end portion and a second end portion opposite to each other. The first end portion is wider than the second end portion located farther away from the inlet channel than the first end portion. When the first piston is moved a distance smaller than a threshold distance, the first piston is moved relative to the second piston while the second piston is stationary relative to the casing. When the first piston is moved a distance greater than the threshold distance, the first piston forces the second piston to move relative to the casing.

10 Claims, 12 Drawing Sheets

BICYCLE HYDRAULIC ASSEMBLY AND BICYCLE BRAKE DEVICE

CROSS-REFERENCE TO RELATED APPLICATIONS

This non-provisional application claims priority under 35 U.S.C. § 119(a) on Patent Application No(s). 109132252 filed in Taiwan, R.O.C. on Sep. 18, 2020, the entire contents of which are hereby incorporated by reference.

TECHNICAL FIELD

The disclosure relates to a hydraulic assembly and a brake device, more particularly to a bicycle hydraulic assembly and a bicycle brake device.

BACKGROUND

In recent years, road bikes, mountain bikes and other types of bicycles are all popular in the market, and it motivates bicycle manufacturers to pay more attention on improving their products.

For the brake of the bicycle, a brake lever assembly can drive a caliper to clamp a brake disk fixed on a bicycle wheel via oil. When the brake lever assembly is operated, a piston inside the brake lever assembly forces the oil to flow into the caliper, such that the caliper is driven to clamp the brake disk to brake the bicycle wheel. However, the oil pressure produced by the movement of the piston of the brake lever assembly is insufficient, causing the braking force that the caliper applies on the bicycle wheel is not strong enough. Therefore, how to solve the aforementioned issue is one of the crucial topics in this field.

SUMMARY OF THE INVENTION

The disclosure provides a bicycle hydraulic assembly and a bicycle brake device capable of providing a sufficient hydraulic pressure required for braking.

One embodiment of the disclosure provides a bicycle hydraulic assembly. The bicycle hydraulic assembly is configured to accommodate an oil. The bicycle hydraulic assembly includes a casing, a first piston, and a second piston. The casing has a hydraulic chamber, an inlet channel, and an outlet channel. The inlet channel and the outlet channel are connected to the hydraulic chamber. The first piston is movably located in the hydraulic chamber. The second piston is movably located in the hydraulic chamber and sleeved on the first piston. The second piston has a first end portion and a second end portion located opposite to each other. An outer diameter of the first end portion is greater than an outer diameter of the second end portion, and the second end portion is located farther away from the inlet channel than the first end portion. When the first piston is moved a distance smaller than a threshold distance by the oil, the first piston is moved relative to the second piston while the second piston is stationary relative to the casing. When the first piston is moved a distance greater than the threshold distance by the oil, the first piston forces the second piston to move relative to the casing.

Another embodiment of the disclosure provides a bicycle brake device. The bicycle brake device is configured to accommodate an oil. The bicycle brake device includes a brake lever assembly and a hydraulic assembly. The brake lever assembly has an oil outlet. The hydraulic assembly is disposed on the brake lever assembly. The hydraulic assembly includes a casing, a first piston, and a second piston. The casing has a hydraulic chamber, an inlet channel, and an outlet channel. The inlet channel and the outlet channel are connected to the hydraulic chamber, and the inlet channel is in fluid communication with the oil outlet of the brake lever assembly. The first piston is movably located in the hydraulic chamber. The second piston is movably located in the hydraulic chamber and sleeved on the first piston. The second piston has a first end portion and a second end portion located opposite to each other. An outer diameter of the first end portion is greater than an outer diameter of the second end portion, and the second end portion is located farther away from the inlet channel than the first end portion. When the first piston is moved a distance smaller than a threshold distance by the oil, the first piston is moved relative to the second piston while the second piston is stationary relative to the casing. When the first piston is moved a distance greater than the threshold distance by the oil, the first piston forces the second piston to move relative to the casing.

Still another embodiment of the disclosure provides a bicycle brake device. The bicycle brake device is configured to accommodate an oil. The bicycle brake device includes a caliper and a hydraulic assembly. The caliper has an oil inlet. The hydraulic assembly is disposed on the caliper. The hydraulic assembly includes a casing, a first piston, and a second piston. The casing has a hydraulic chamber, an inlet channel, and an outlet channel. The inlet channel and the outlet channel are connected to the hydraulic chamber, and the outlet channel is in fluid communication with the oil inlet of the caliper. The first piston is movably located in the hydraulic chamber. The second piston is movably located in the hydraulic chamber and sleeved on the first piston. The second piston has a first end portion and a second end portion located opposite to each other. An outer diameter of the first end portion is greater than an outer diameter of the second end portion, and the second end portion is located farther away from the inlet channel than the first end portion. When the first piston is moved a distance smaller than a threshold distance by the oil, the first piston is moved relative to the second piston while the second piston is stationary relative to the casing. When the first piston is moved a distance greater than the threshold distance by the oil, the first piston forces the second piston to move relative to the casing.

According to the bicycle hydraulic assemblies and the bicycle brake devices as discussed in the above embodiments, since the outer diameter of the first end portion of the second piston is greater than the outer diameter of the second end portion of the second piston, and the first piston is able to move the second piston when the first piston was moved a distance exceeding the threshold distance, the oil pressure in the outlet channel can be increased and thereby increasing the brake force that the caliper exerting on the wheel.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
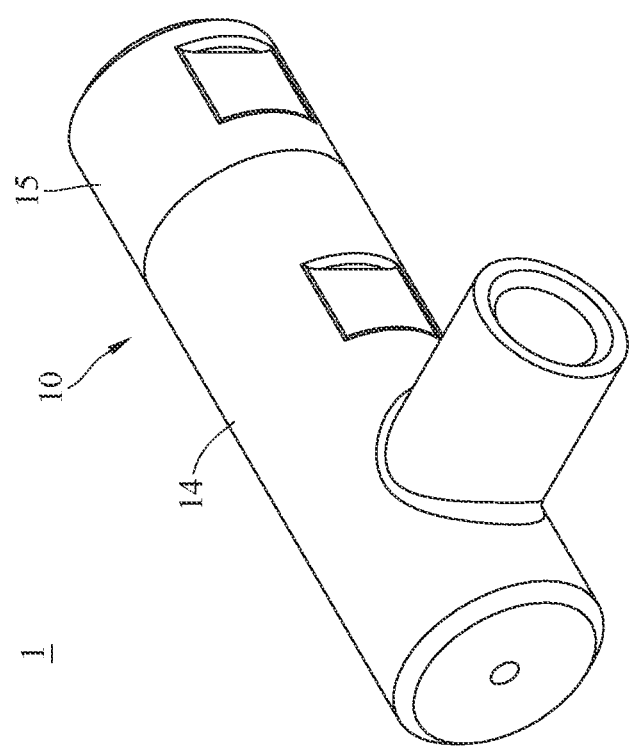
FIG. 1 is a perspective view of a bicycle hydraulic assembly according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
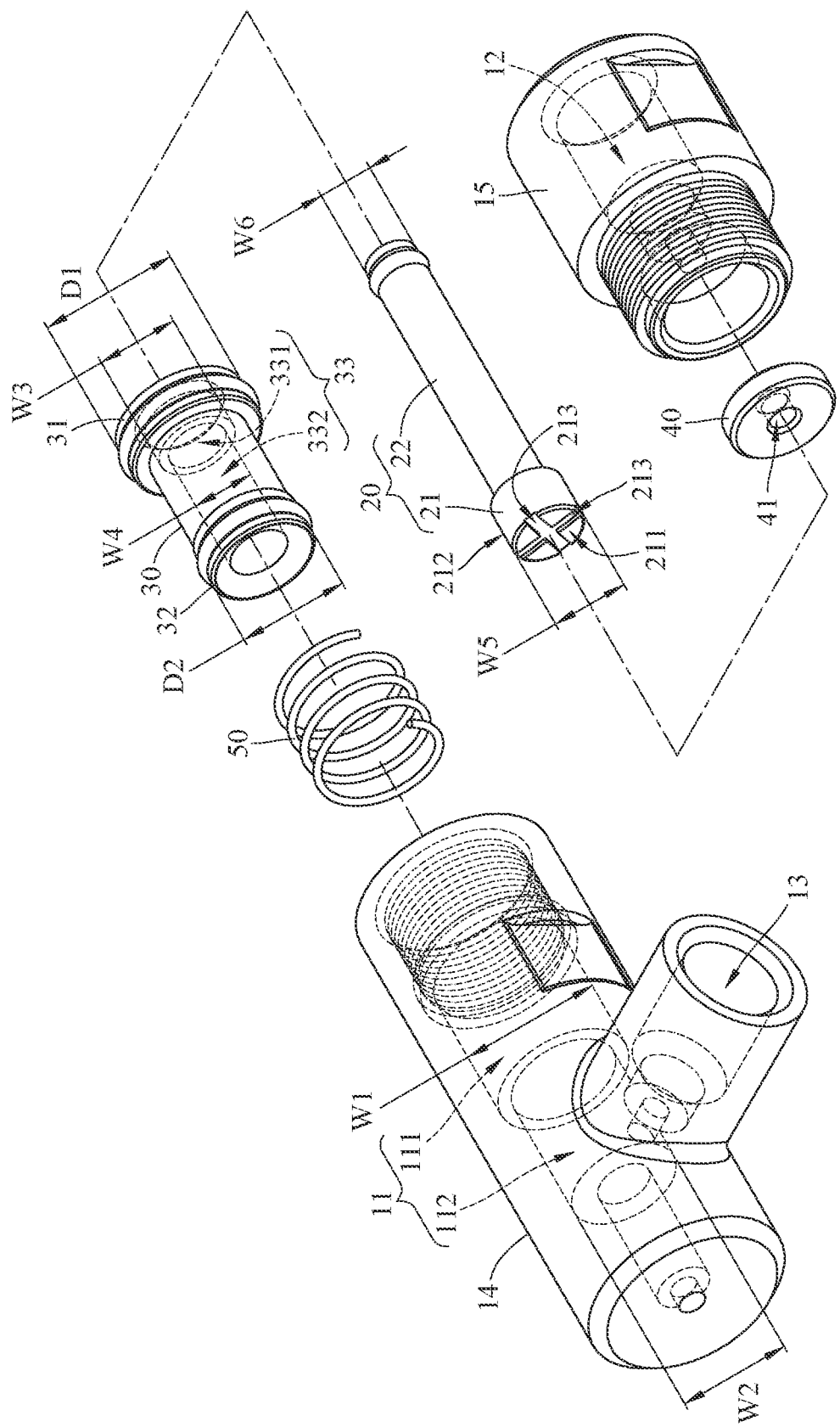
FIG. 2 is an exploded view of the bicycle hydraulic assembly in FIG. 1.
Figure 3:
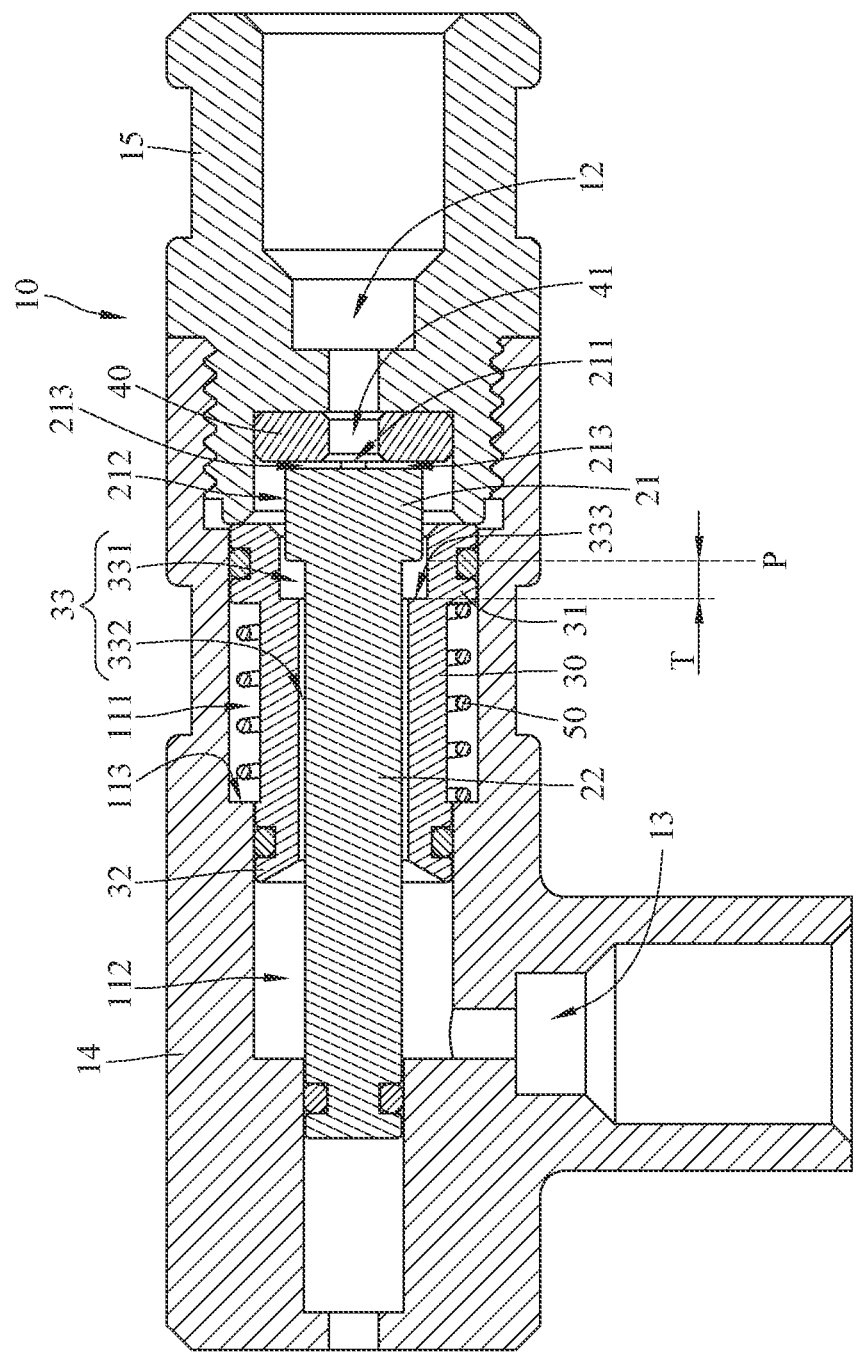
FIG. 3 is a cross-sectional view of the bicycle hydraulic assembly in FIG. 1.

Referring to FIGS. 1 to 3, there are shown a perspective view, an exploded view, and a cross-sectional view of a bicycle hydraulic assembly 1 according to a first embodiment of the disclosure.

In this embodiment, the bicycle hydraulic assembly 1 has a configuration capable of containing oil (not shown) circulating behind the brake. Specifically, the hydraulic assembly 1 includes a casing 10, a first piston 20, and a second piston 30. In this embodiment, the bicycle hydraulic assembly 1 may further include a magnet 40 and an elastic component 50.

The casing 10 has a hydraulic chamber 11, an inlet channel 12, and an outlet channel 13. Specifically, the casing 10 includes a first part 14 and a second part 15 assembled to each other, the hydraulic chamber 11 and the outlet channel 13 are located in the first part 14, and the inlet channel 12 is located in the second part 15. The hydraulic chamber 11 has a first chamber 111 and a second chamber 112 connected to each other. A width W1 of the first chamber 111 is greater than a width W2 of the second chamber 112. The first chamber 111 is located closer to the inlet channel 12 than the second chamber 112. The inlet channel 12 and the outlet channel 13 are respectively connected to the first chamber 111 and the second chamber 112. In this embodiment, the inlet channel 12 may be connected to a brake lever assembly (not shown) via a tube (not shown), and the outlet channel 13 may be connected to a caliper (not shown) via another tube (not shown).

The first piston 20 is movably located in the hydraulic chamber 11, and different portions of the first piston 20 are respectively located in the first chamber 111 and the second chamber 112 of the hydraulic chamber 11. Specifically, the first piston 20 includes a head portion 21 and a body portion 22 connected to each other, the head portion 21 is located in the first chamber 111, and the body portion 22 extends outward from the first chamber 111 and is located in the second chamber 112.

The second piston 30 is movable located in the hydraulic chamber 11, and different portions of the second piston 30 are respectively located in the first chamber 111 and the second chamber 112 of the hydraulic chamber 11. The second piston 30 has a first end portion 31, a second end portion 32, and a through hole 33. An outer diameter D1 of the first end portion 31 is greater than an outer diameter D2 of the second end portion 32 of the second piston 30. The first end portion 31 and the second end portion 32 of the second piston 30 are respectively located in the first chamber 111 and the second chamber 112. The body portion 22 of the first piston 20 is disposed through the through hole 33 of the second piston 30; that is, the second piston 30 is sleeved on the body portion 22 of the first piston 20. In this embodiment, the through hole 33 of the second piston 30 has a wide portion 331 and a narrow portion 332 connected to each other. The wide portion 331 of the through hole 33 is located closer to the inlet channel 12 than the narrow portion 332. A width W3 of the wide portion 331 is greater than a width W4 of the narrow portion 332. A contact surface 333 is formed between the wide portion 331 and the narrow portion 332. A width W5 of the head portion 21 of the first piston 20 is smaller than the width W3 of the wide portion 331 of the through hole 33 and greater than the width W4 of the narrow portion 332 of the through hole 33. A width W6 of the body portion 22 of the first piston 20 is smaller than the width W4 of the narrow portion 332 of the through hole 33. The body portion 22 of the first piston 20 is partially located in the narrow portion 332 of the through hole 33. The contact surface 333 is located farther away from the inlet channel 12 than the head portion 21 of the first piston 20.

In this embodiment, the magnet 40 is disposed in the first chamber 111 and located at a side of the head portion 21 of the first piston 20 located away from the contact surface 333. The magnet 40 has a hole 41 aligned with and in fluid communication with the inlet channel 12. The first piston 20 is made of, for example, any suitable ferrous material. The magnet 40 is provided to force the head portion 21 of the first piston 20 to move away from the contact surface 333.

In this embodiment, the head portion 21 of the first piston 20 has a top surface 211, an annular outer surface 212, and a plurality of recesses 213. The top surface 211 of the first piston 20 faces the magnet 40. The annular outer surface 212 of the first piston 20 is connected to the top surface 211. The recesses 213 are recessed from the top surface 211 and connected to the annular outer surface 212. The recesses 213 are in fluid communication with one another and also in fluid communication with the wide portion 331 of the through hole 33. Note that the first piston of another embodiment may have only one recess on its top surface.

The elastic component 50 is, for example, a compression spring. The elastic component 50 is located in the first chamber 111 and sleeved on the second piston 30. Two opposite ends of the elastic component 50 respectively press against the first end portion 31 of the second piston 30 and a contact surface 113 formed between the first chamber 111 and the second chamber 112. The elastic component 50 is configured to force the second piston 30 to move toward the inlet channel 12.

As shown in FIG. 3, when the first piston 20 is in an initial position P, the top surface 211 of the first piston 20 is in contact with the magnet 40, and the head portion 21 of the first piston 20 is spaced apart from the contact surface 333 located in the through hole 33 of the second piston 30, such that the inlet channel 12 is in fluid communication with the outlet channel 13 via the hole 41 of the magnet 40, the recesses 213 of the first piston 20, the through hole 33, and the second chamber 112. At this moment, when the brake lever assembly is pushed, oil flows through the tube connected to the brake lever assembly, the inlet channel 12, the hole 41 of the magnet 40, the recesses 213 of the first piston 20, the through hole 33, the second chamber 112, the outlet channel 13, the tube connected to the caliper and then push pistons of the caliper, such that linings of the caliper are pushed to against the brake disk (not shown).

When the linings are clamping the bicycle disk and the caliper is unable to further squeeze the linings against the disk, the oil pressure inside the hydraulic chamber 11 of the casing 10 gradually increases, causing the first piston 20 to move relative to the casing 10.

Figure 4:
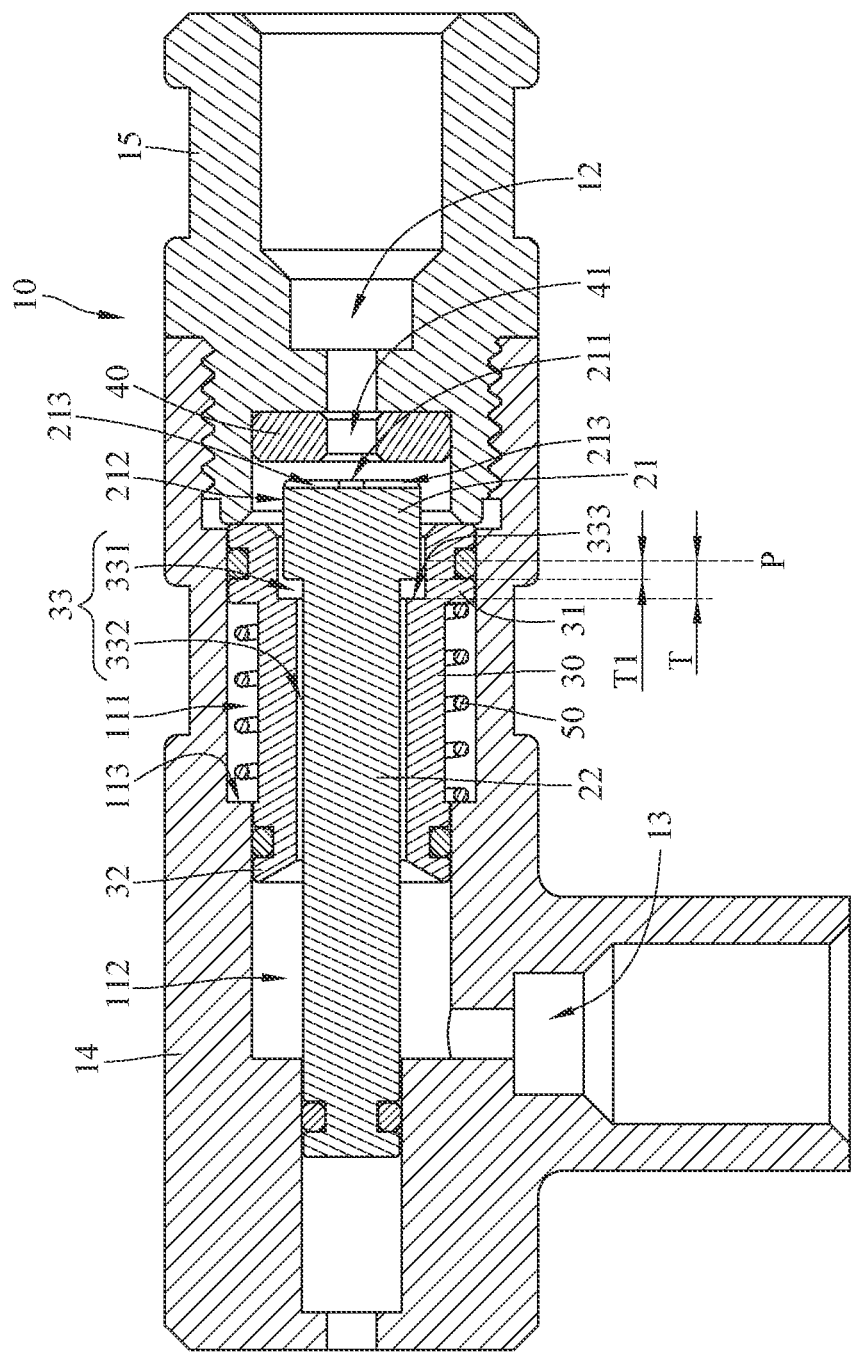
FIG. 4 is a cross-sectional view of the bicycle hydraulic assembly in FIG. 1 when a first piston is moved a distance smaller than a threshold distance.

Then, referring to FIG. 4, it depicts a cross-sectional view of the bicycle hydraulic assembly 1 when the first piston 20 has moved a distance T1 from the initial position P.

As shown, when the first piston 20 has moved a distance T1 from the initial position P, the distance T1 is smaller than a threshold distance T, thus the first piston 20 is moved relative to the second piston 30 but the second piston 30 remains at the same position. At this moment, the head portion 21 of the first piston 20 is still spaced apart from the contact surface 333, thus the inlet channel 12 is still in fluid communication with the second chamber 112 via the through hole 33.

Figure 5:
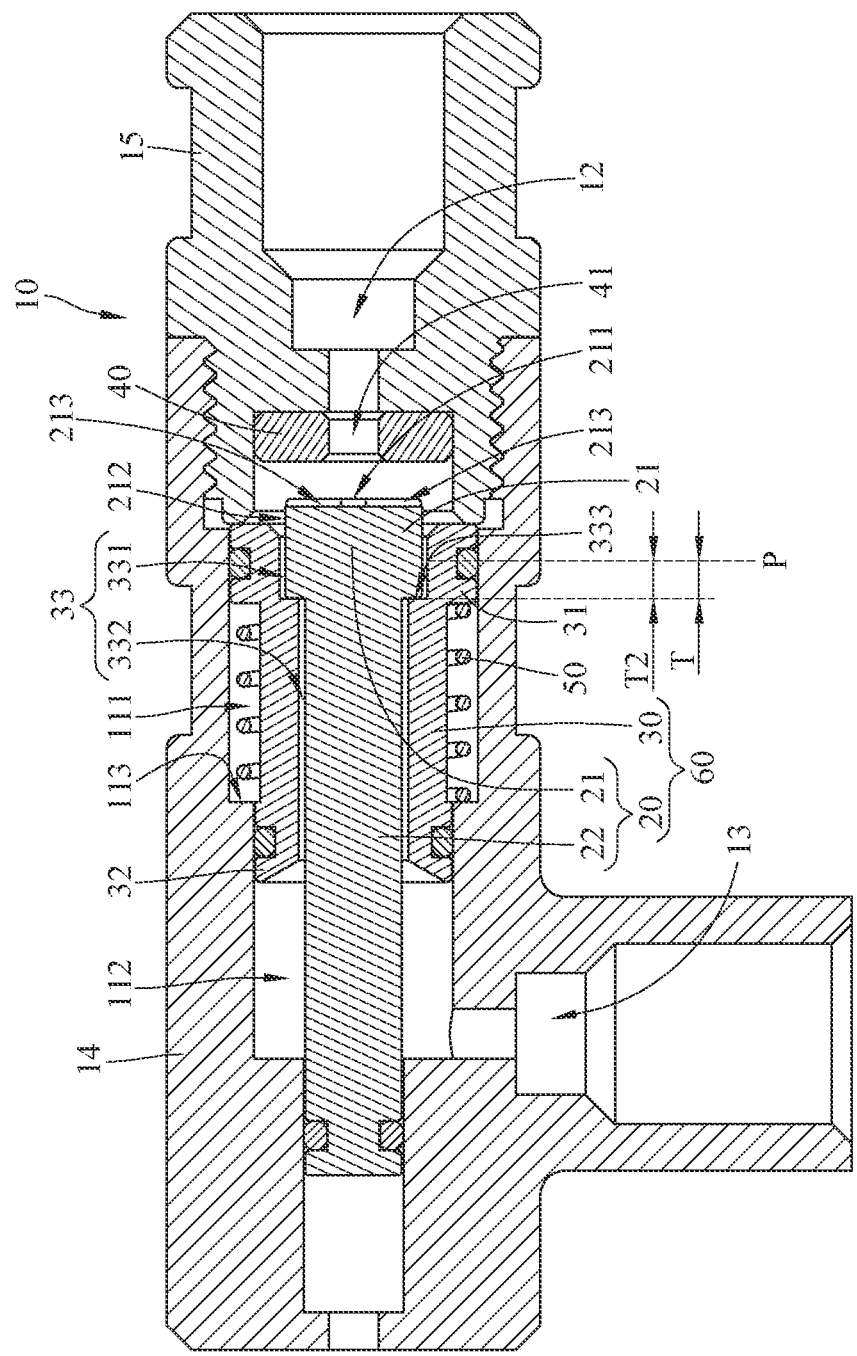
FIG. 5 is a cross-sectional view of the bicycle hydraulic assembly in FIG. 1 when the first piston is moved a distance equal to the threshold distance.
Figure 6:
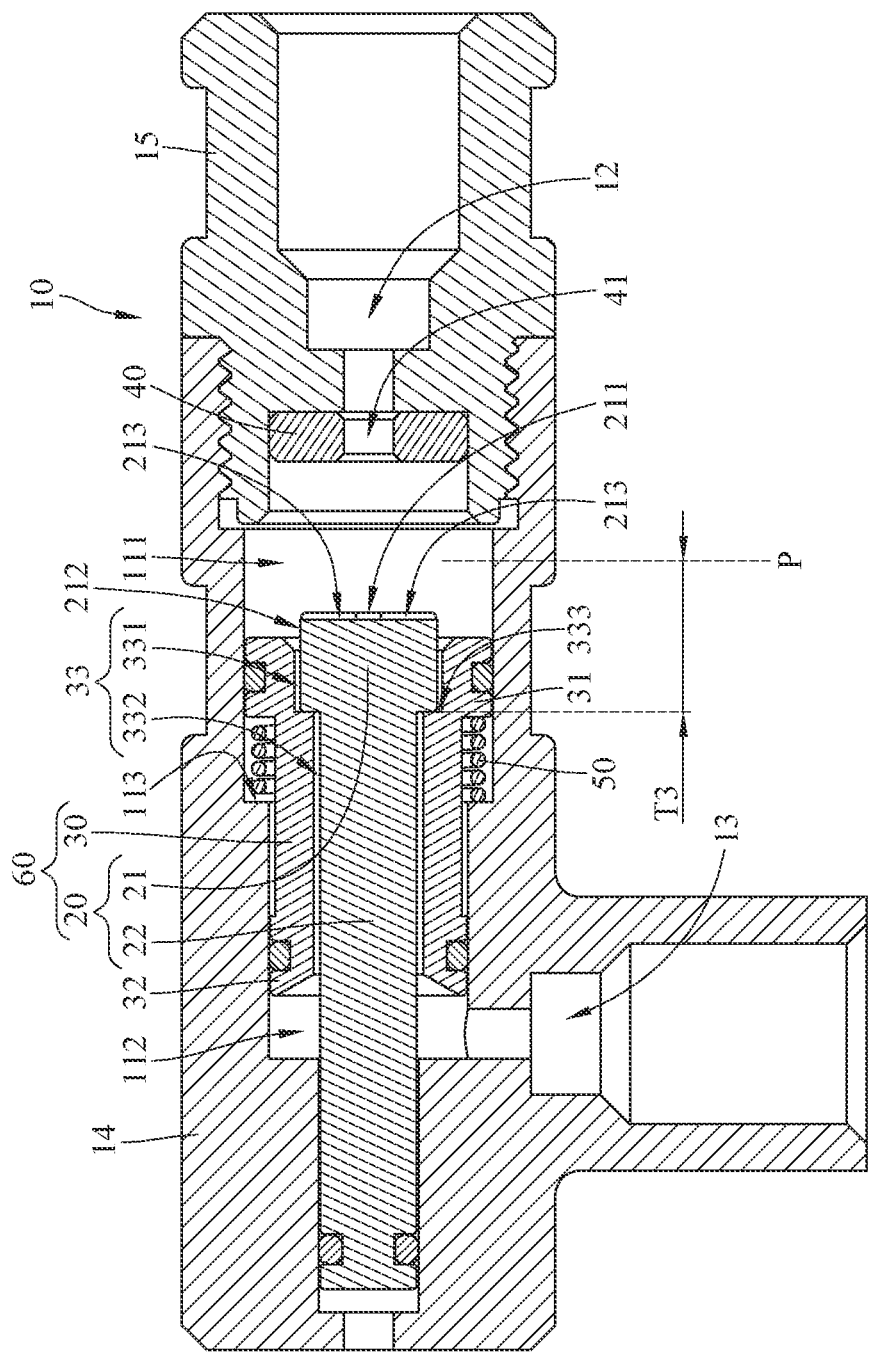
FIG. 6 is a cross-sectional view of the bicycle hydraulic assembly in FIG. 1 when the first piston is moved a distance greater than the threshold distance.

Then, referring to FIGS. 5 and 6, FIG. 5 depicts a cross-sectional view of the bicycle hydraulic assembly 1 when the first piston 20 has moved the threshold distance T from the initial position P, and FIG. 6 depicts a cross-sectional view of the bicycle hydraulic assembly 1 when the first piston 20 has moved a distance T3 greater than the threshold distance T from the initial position P.

As shown in FIG. 5, when the first piston 20 has moved the threshold distance T from the initial position P (i.e., a distance T2), the head portion 21 of the first piston 20 is in contact with the contact surface 333 so as to block the through hole 33, such that the inlet channel 12 is not in fluid communication with the second chamber 112. At this moment, the first piston 20 and the second piston 30 temporarily become into a single piston 60. As the oil keeps pushing the first piston 20 further away from the initial position P, the oils pushes the second piston 30 relative to the casing 10 by pushing the first piston 20, such that the piston 60 compresses the elastic component 50 with the casing 10.

Then, as shown in FIG. 6, when the first piston 20 has moved a distance T3 that is greater than the threshold distance T from the initial position P, the piston 60 is in a static equilibrium state; that is, the force that the oil in the first chamber 111 applies on the piston 60 is substantially equal to the force that the oil in the second chamber 112 applies against the piston 60. The force that the oil in the first chamber 111 applies on the piston 60 is exerted on a surface of the head portion 21 of the first piston 20 facing the inlet channel 12 and a surface of the first end portion 31 of the second piston 30 facing the inlet channel 12. The sum of the surface area of the surface of the head portion 21 of the first piston 20 facing the inlet channel 12 and the surface area of the surface of the first end portion 31 of the second piston 30 facing the inlet channel 12 is approximately equal to $(D1/2)^2 \times \pi$, where D1 is denoted as the outer diameter of the first end portion 31 of the second piston 30. In addition, the force that the oil in the second chamber 112 applies on the piston 60 is exerted on a surface of the second end portion 32 of the second piston 30 located close to the outlet channel 13. Since the body portion 22 of the first piston 20 is disposed through the through hole 33 so as to have a portion located in the second chamber 112, the surface area that the oil in the second chamber 112 applies on the piston 60 may be approximately equal to $(D2/2)^2 \times \pi - (W6/2)^2 \times \pi$, where D2 is denoted as the outer diameter of the second end portion 32 of the second piston 30, and W6 is denoted as the outer diameter of the body portion 22 of the first piston 20.

During the static equilibrium state of the piston 60, the surface area that the oil in the first chamber 111 applies on the piston 60 is larger than the surface area that the oil in the second chamber 112 applies on the piston 60, thus the oil pressure in the first chamber 111 is smaller than that in the second chamber 112, where the ratio of the oil pressure in the second chamber 112 to the oil pressure in the first chamber 111 is approximately equal to the ratio of the surface area that the oil in the first chamber 111 applies on the piston 60 to the surface area that the oil in the second chamber 112 applies on the piston 60. For example, the outer diameter D1 of the first end portion 31 of the second piston 30 is 10 mm, the outer diameter D2 of the second end portion 32 of the second piston 30 is 6 mm, then the outer diameter (e.g., W6) of the body portion 22 of the first piston 20 is 3.5 mm, and the ratio of the oil pressure in the second chamber 112 to the oil pressure in the first chamber 111 may be above 4, as shown below:

$$5 \times 5 \times 3.14 / (3 \times 3 \times 3.14 - 1.75 \times 1.75 \times 3.14) = 4.2$$

As discussed, since the outer diameter D1 of the first end portion 31 of the second piston 30 is greater than the outer diameter D2 of the second end portion 32 of the second piston 30, and the first piston 20 is able to move the second piston 30 when the first piston 20 was moved a distance exceeding the threshold distance T, the oil pressure in the outlet channel 13 can be increased and thereby increasing the brake force that the caliper exerting on the wheel.

When the lever is released, the force that the oil in the first chamber 111 applies on the first piston 20 is removed, the elastic component 50 pushes the second piston 30 back to its original position, and then the magnet 40 forces the first piston 20 back to the initial position P.

Figure 7:
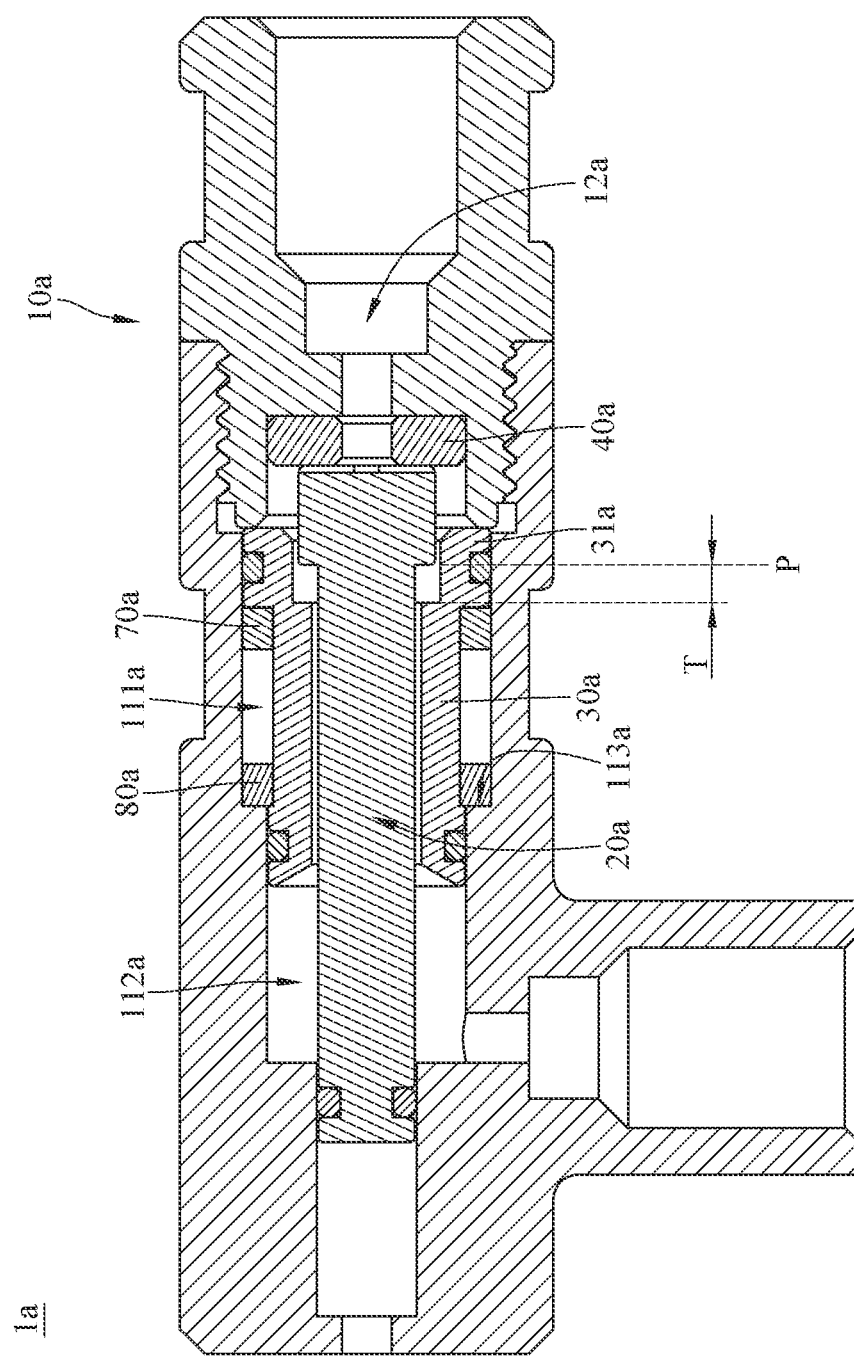
FIG. 7 is a cross-sectional view of a bicycle hydraulic assembly according to a second embodiment of the disclosure.
Figure 8:
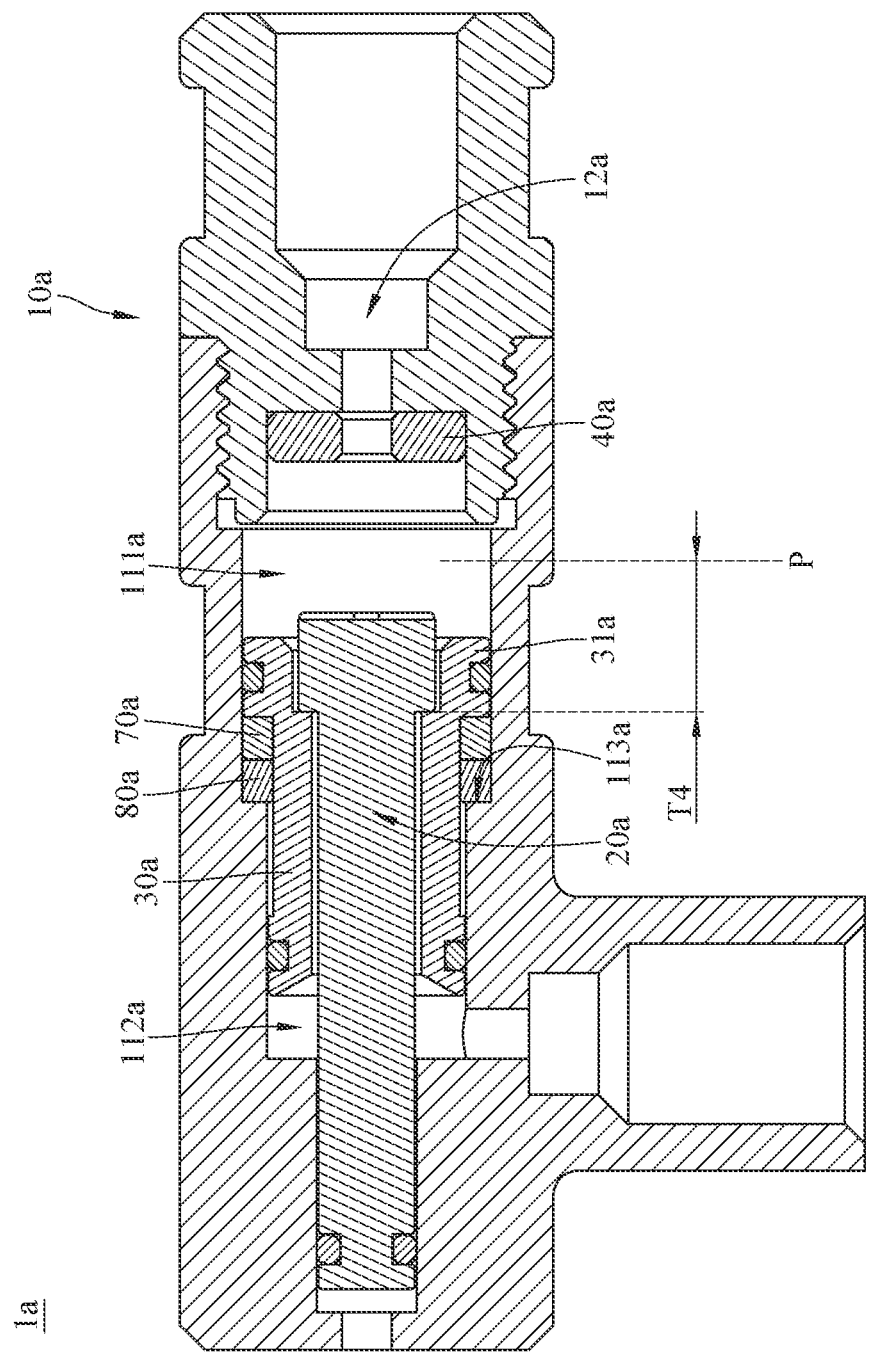
FIG. 8 is a cross-sectional view of the bicycle hydraulic assembly in FIG. 7 when a first piston is moved a distance greater than a threshold distance.

Then, referring to FIGS. 7 and 8, there are shown a cross-sectional view of a bicycle hydraulic assembly 1a according to a second embodiment of the disclosure and a cross-sectional view of the bicycle hydraulic assembly 1a in FIG. 7 when a first piston 20a is moved a distance T4 greater than a threshold distance T.

The bicycle hydraulic assembly 1a has a configuration similar to that of the bicycle hydraulic assembly 1 of the previous embodiment, thus only the differences between these two embodiments will be described in detail hereinafter. Specifically, in the bicycle hydraulic assembly 1a, the components used to force the second piston to return to its original position is different from that of the previous embodiment, thus the following paragraphs are mainly for the details of the components of the bicycle hydraulic assembly 1a used to force the second piston to return to its original position, and the other components and structures may be understood with reference to the aforementioned descriptions.

In this embodiment, the bicycle hydraulic assembly 1a includes two magnet 70a and 80a instead of the elastic component. The magnets 70a and 80a are located in a first chamber 111a of a casing 10a. The magnet 70a is in contact with a first end portion 31a of a second piston 30a, and the magnet 80a is in contact with a contact surface 113a formed between the first chamber 111a and a second chamber 112a of the casing 10a. The magnets 70a and 80a are repulsive from each other to provide a force to move the second piston 30a toward an inlet channel 12a of the casing 10a.

As shown in FIG. 8, when the first piston 20a is moved a distance T4 greater than the threshold T from the initial position P by the oil, the second piston 30 is moved by the first piston 20a, and the magnet 70a is moved toward the magnet 80 by the first end portion 31a of the second piston 30a. When the force that the oil applies on the first piston 20a is removed, the repulsive force between the magnets 70a and 80a makes the magnet 70a move the second piston 30a back to its original position, and the magnet 40a forces the first piston 20a to return to the initial position P.

Figure 9:
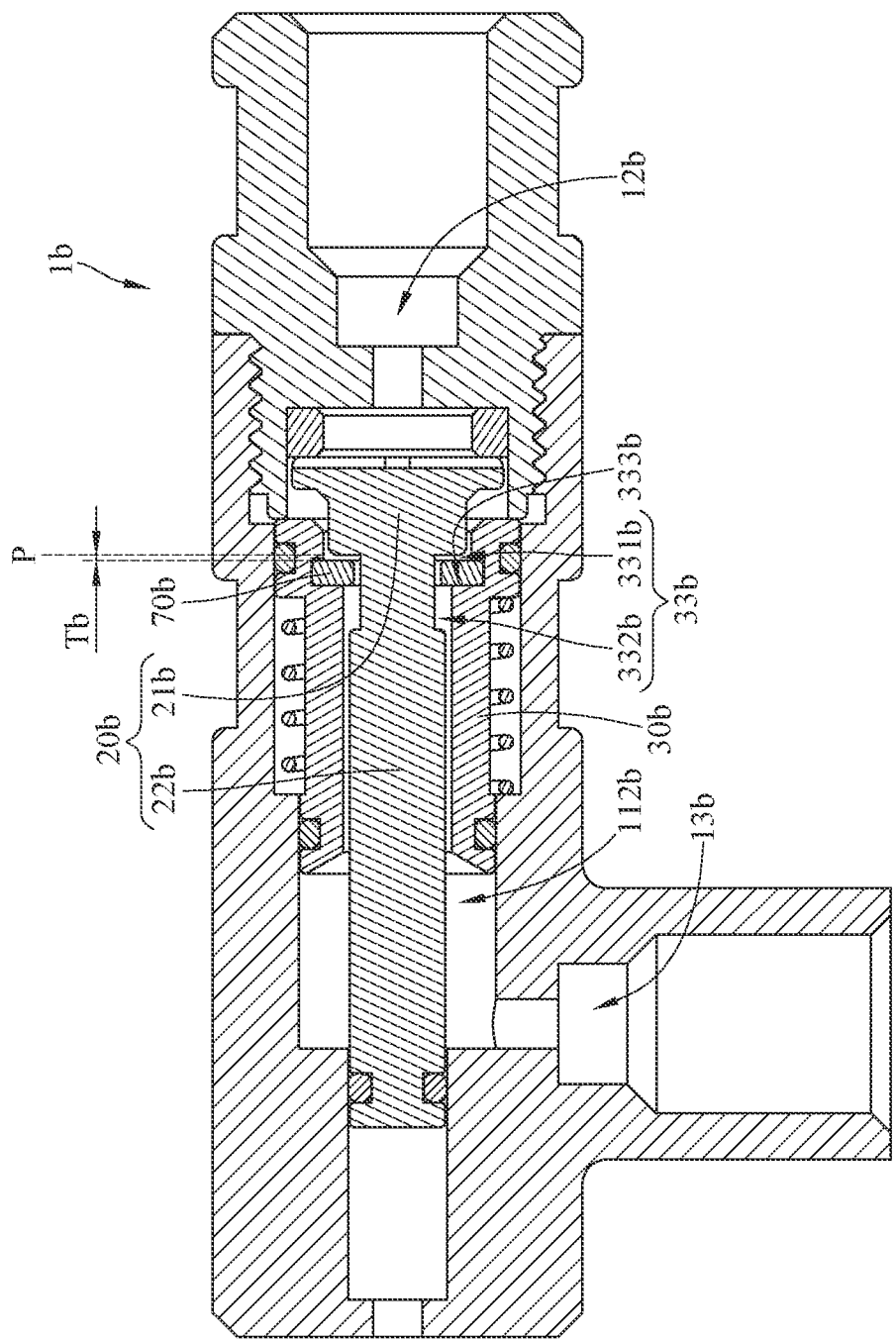
FIG. 9 is a cross-sectional view of a bicycle hydraulic assembly according to a third embodiment of the disclosure.

Then, referring to FIG. 9, there is shown a cross-sectional view of a bicycle hydraulic assembly 1b according to a third embodiment of the disclosure.

In this embodiment, the bicycle hydraulic assembly 1b is similar with the hydraulic assembly 1 of the previous embodiment, and therefore the following paragraphs mainly introduce the difference between them, and the other components and structures may be understood with reference to the aforementioned descriptions.

As shown, the bicycle hydraulic assembly 1b further includes a sealing ring 70b. The sealing ring 70b is, for example, made of rubber. The sealing ring 70b is located in a wide portion 331b of a through hole 33b of a second piston 30b. A body portion 22b of a first piston 20b is disposed through the sealing ring 70b and partially located in a narrow portion 332b of the through hole 33b. The sealing ring 70b is located between a head portion 21b of the first piston 20b and a contact surface 333b of the through hole 33b. When the first piston 20b is moved a distance smaller than a threshold distance Tb from the initial position P by the oil, the head portion 21b of the first piston 20b is spaced apart from the sealing ring 70b, such that the inlet channel 12b is in fluid communication the second chamber 112b via the through hole 33b so as to be in fluid communication with the outlet channel 13b.

Figure 10:
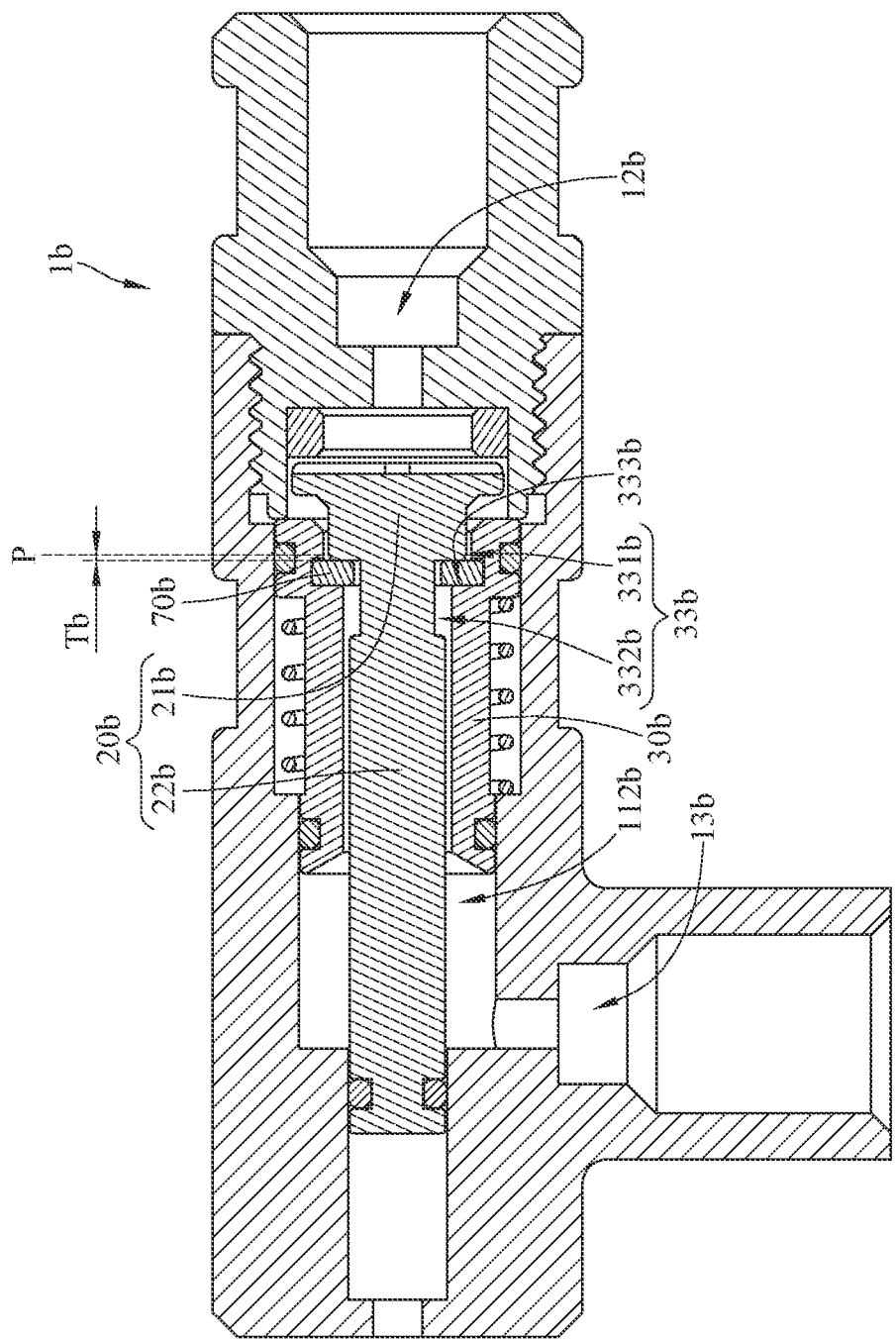
FIG. 10 is a cross-sectional view of the bicycle hydraulic assembly in FIG. 7 when a first piston is moved a distance equal to a threshold distance.

Then, referring to FIG. 10, there is shown a cross-sectional view of the bicycle hydraulic assembly 1b in FIG. 7 when the first piston 20b is moved a distance equal to a threshold distance.

When the first piston 20b is moved a distance equal to the threshold distance Tb from the initial position P by the oil, the sealing ring 70b is clamped between the head portion 21b of the first piston 20b and the contact surface 333b so as to block the through hole 33b, such that the inlet channel 12b is not in fluid communication with the second chamber 112b, and thus not in fluid communication with the outlet channel 13b.

In this embodiment, the sealing ring 70b can further ensure the through hole 33b is blocked for preventing the inlet channel 12b from being in fluid communication with the outlet channel 13b.

Figure 11:
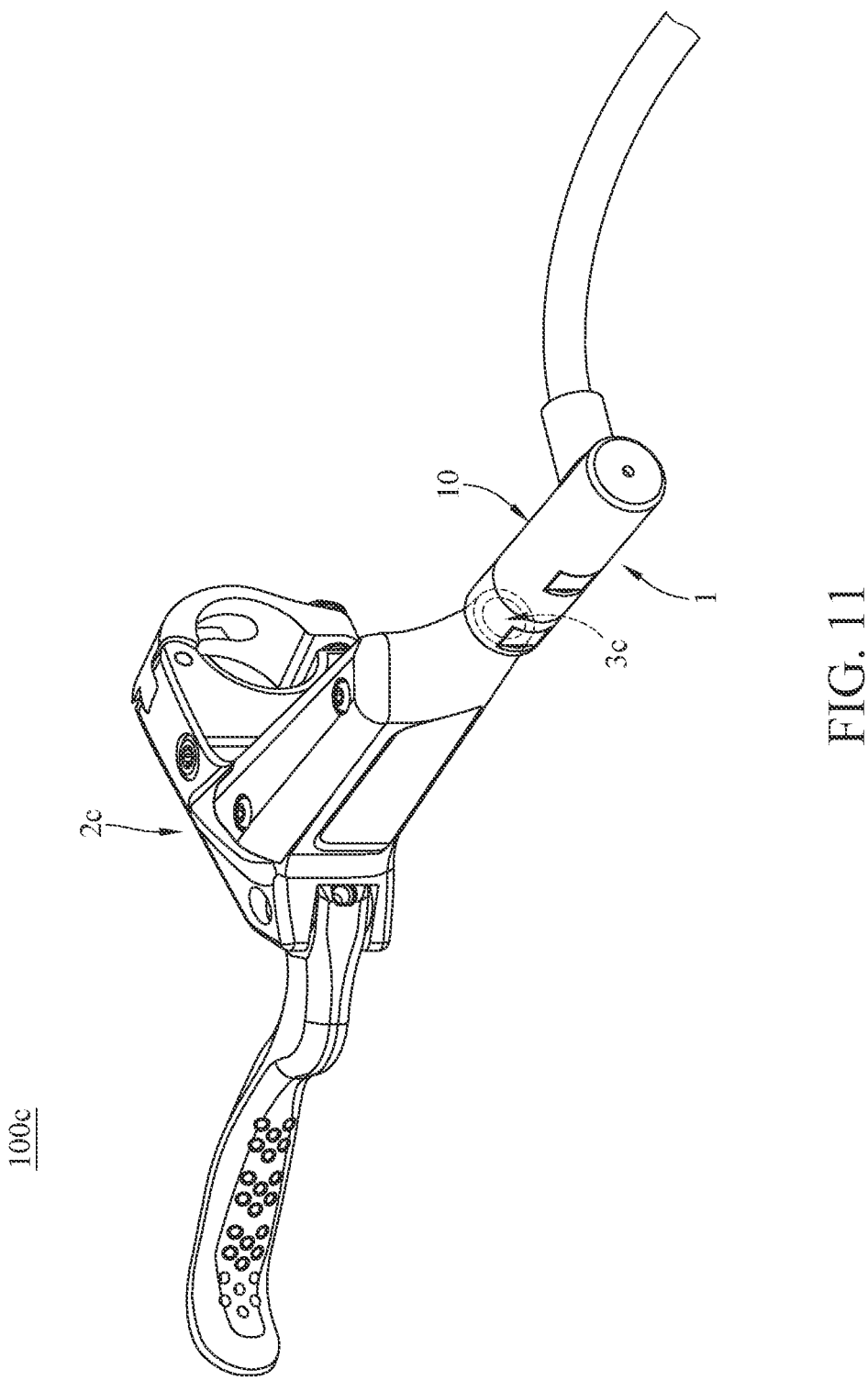
FIG. 11 is a perspective view of a bicycle brake device according to a fourth embodiment of the disclosure.

Then, referring to FIG. 11, there is a perspective view of a bicycle brake device 100c according to a fourth embodiment of the disclosure.

In this embodiment, the bicycle brake device 100c is configured to accommodate an oil (not shown). The bicycle brake device 100c includes a brake lever assembly 2c and a hydraulic assembly 1. The hydraulic assembly 1 is directly disposed on the brake lever assembly 2c. The hydraulic assembly 1 of this embodiment is the same as the hydraulic assembly 1 of the previous embodiment, and thus the detail of the hydraulic assembly 1 will not be repeatedly introduced. The brake lever assembly 2c has an oil outlet 3c. The inlet channel 12 (as shown in FIG. 3) of the casing 10 of the hydraulic assembly 1 is in fluid communication with the oil outlet 3c of the brake lever assembly 2c.

Note that the hydraulic assembly 1 is not restricted to be located outside the brake lever assembly 2c; in some other embodiments, the hydraulic assembly and the brake lever assembly may share the same casing, and the other components of the hydraulic assembly are disposed in such casing. In addition, the bicycle brake device may include the hydraulic assembly 1a or 1b of the previous embodiment.

Figure 12:
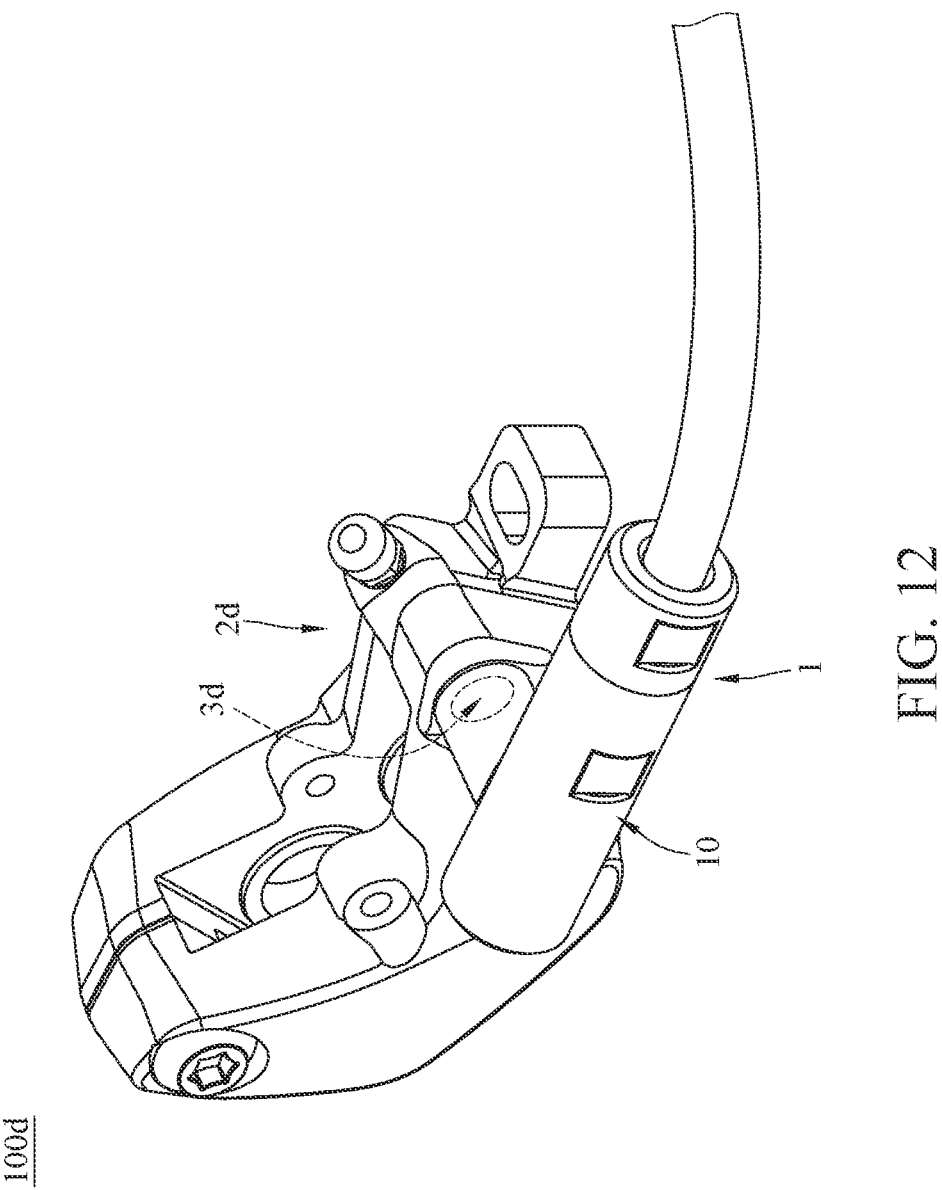
FIG. 12 is a perspective view of a bicycle brake device according to a fifth embodiment of the disclosure.

Then, referring to FIG. 12, there is shown a perspective view of a bicycle brake device 1d according to a fifth embodiment of the disclosure.

In this embodiment, the bicycle brake device 100d is configured to accommodate an oil. The bicycle brake device 100d includes a caliper 2d and a hydraulic assembly 1. The hydraulic assembly 1 is directly disposed on the caliper 2d. The hydraulic assembly 1 is the same as the hydraulic assembly 1 of the previous embodiment, and thus the detail of the hydraulic assembly 1 will not be repeatedly introduced. The caliper 2d has an oil inlet 3d. The outlet channel 13 (as shown in FIG. 3) of the casing 10 of the hydraulic assembly 1 is in fluid communication with the oil inlet 3d of the caliper 2d.

Note that the hydraulic assembly is not restricted to be located outside the caliper 2d; in some other embodiments, the hydraulic assembly and the caliper may share the same casing, and the other components of the hydraulic assembly are disposed in such casing. In addition, the bicycle brake device may include the hydraulic assembly 1a or 1b of the previous embodiment.

According to the bicycle hydraulic assemblies and the bicycle brake devices as discussed in the above embodiments, since the outer diameter of the first end portion of the second piston is greater than the outer diameter of the second end portion of the second piston, and the first piston is able to move the second piston when the first piston was moved a distance exceeding the threshold distance, the oil pressure in the outlet channel can be increased and thereby increasing the brake force that the caliper exerting on the wheel.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle hydraulic assembly, configured to accommodate an oil, comprising:
  a casing, having a hydraulic chamber, an inlet channel, and an outlet channel, wherein the inlet channel and the outlet channel are connected to the hydraulic chamber;
  a first piston, movably located in the hydraulic chamber; and a second piston, movably located in the hydraulic chamber and sleeved on the first piston, wherein the second piston has a first end portion and a second end portion located opposite to each other, an outer diameter of the first end portion is greater than an outer diameter of the second end portion, and the second end portion is located farther away from the inlet channel than the first end portion;

wherein when the first piston is moved a distance smaller than a threshold distance by the oil, the first piston is moved relative to the second piston while the second piston is stationary relative to the casing;

wherein when the first piston is moved a distance greater than the threshold distance by the oil, the first piston forces the second piston to move relative to the casing;

wherein the hydraulic chamber has a first chamber and a second chamber connected to each other, a width of the first chamber is greater than a width of the second chamber, the first chamber is located closer to the inlet channel than the second chamber, the inlet channel and the outlet channel are respectively connected to the first chamber and the second chamber, different portions of the first piston are respectively located in the first chamber and the second chamber, the first end portion and the second end portion of the second piston are respectively located in the first chamber and the second chamber, the second piston has a through hole, the first piston is disposed through the through hole of the second piston; when the first piston is moved the distance smaller than the threshold distance by the oil, the inlet channel is in fluid communication with the second chamber via the through hole of the second piston; when the first piston is moved a distance equal to the threshold distance by the oil, the first piston blocks the through hole, such that the inlet channel is not in fluid communication with the second chamber.

2. The bicycle hydraulic assembly according to claim 1, wherein the through hole of the second piston has a wide portion and a narrow portion connected to each other, a width of the wide portion is larger than a width of the narrow portion, a contact surface is formed between the wide portion and the narrow portion, the wide portion is located closer to the inlet channel than the narrow portion, the first piston comprises a head portion and a body portion connected to each other, a width of the head portion is smaller than the width of the wide portion and greater than the width of the narrow portion of the through hole, a width of the body portion is smaller than the width of the narrow portion of the through hole, the body portion is partially located in the narrow portion; when the first piston is moved the distance smaller than the threshold distance by the oil, the head portion of the first piston is spaced apart from the contact surface, such that the inlet channel is in fluid communication with the second chamber via the through hole; when the first piston is moved the distance equal to the threshold distance by the oil, the head portion of the first piston is in contact with the contact surface so as to block the through hole.

3. The bicycle hydraulic assembly according to claim 2, further comprising a magnet, wherein the first piston is made of a ferrous material, the magnet is disposed in the first chamber and located at a side of the head portion of the first piston located away from the contact surface, and the magnet is configured to force the head portion of the first piston to move away from the contact surface.

4. The bicycle hydraulic assembly according to claim 3, wherein the magnet has a hole, the hole is in fluid communication with the inlet channel, the first piston has a top surface, an annular outer surface, and at least one recess, the top surface faces the magnet, the annular outer surface is connected to the top surface, the at least one recess is recessed from the top surface and connected to the annular outer surface; when the first piston is in an initial position, the top surface of the first piston is in contact with the magnet, and the inlet channel is in fluid communication with the wide portion of the through hole via the hole of the magnet and the at least one recess of the first piston.

5. The bicycle hydraulic assembly according to claim 1, further comprising two magnets, wherein the magnets are located in the first chamber, one of the magnets is in contact with the first end portion of the second piston, the other one of the magnets is in contact with a contact surface between the first chamber and the second chamber, and the magnets are repulsive from each other so as to provide a force to move the second piston toward the inlet channel.

6. The bicycle hydraulic assembly according to claim 1, further comprising an elastic component, wherein the elastic component is located in the first chamber, and the elastic component is configured to force the second piston to move toward the inlet channel.

7. The bicycle hydraulic assembly according to claim 6, wherein the elastic component is sleeved on the second piston, and two opposite ends of the elastic component respectively press against the first end portion of the second piston and a contact surface between the first chamber and the second chamber.

8. The bicycle hydraulic assembly according to claim 1, further comprising a sealing ring, wherein the through hole of the second piston has a wide portion and a narrow portion connected to each other, a width of the wide portion is greater than a width of the narrow portion, a contact surface is formed between the wide portion and the narrow portion, the wide portion is located closer to the inlet channel than the narrow portion, the sealing ring is located at the wide portion, the first piston comprises a head portion and a body portion connected to each other, a width of the head portion is smaller than the width of the wide portion and greater than the width of the narrow portion of the through hole, a width of the body portion is smaller than the width of the narrow portion of the through hole, the body portion is disposed through the sealing ring and partially located in the narrow portion, the sealing ring is located between the head portion and the contact surface; when the first piston is moved the distance smaller than the threshold distance by the oil, the head portion of the first piston is spaced apart from the sealing ring, such that the inlet channel is in fluid communication with the second chamber via the through hole; when the first piston is moved the distance equal to the threshold distance by the oil, the sealing ring is clamped between the head portion of the first piston and the contact surface so as to block the through hole.

9. A bicycle brake device, configured to accommodate an oil, comprising:
a brake lever assembly, having an oil outlet; and
the hydraulic assembly according to claim 1, disposed on the brake lever assembly, wherein the inlet channel is in fluid communication with the oil outlet of the brake lever assembly.

10. A bicycle brake device, configured to accommodate an oil, comprising:
a caliper, having an oil inlet; and the hydraulic assembly according to claim 1, disposed on the caliper, wherein the outlet channel is in fluid communication with the oil inlet of the caliper.

\* \* \* \* \*